(12) United States Patent
    Augst (10) Patent No.: US 11,072,349 B2
(45) Date of Patent: Jul. 27, 2021

(54) METHOD, APPARATUS AND COMPUTER PROGRAM FOR PRODUCING AND TRANSMITTING A PIECE OF DRIVER INFORMATION

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/289,077

(22) Filed: Feb. 28, 2019

(65) Prior Publication Data

US 2019/0193754 A1    Jun. 27, 2019

Related U.S. Application Data

(63) Continuation of application No. PCT/EP2017/070471, filed on Aug. 11, 2017.

(30) Foreign Application Priority Data

Sep. 1, 2016   (DE) ..................... 10 2016 216 590.9

(51) Int. Cl.
    *B60Q 1/00*    (2006.01)
    *B60W 50/16*   (2020.01)
    (Continued)

(52) U.S. Cl.
    CPC .............. *B60W 50/16* (2013.01); *B60C 9/00* (2013.01); *B60W 50/0097* (2013.01);
    (Continued)

(58) Field of Classification Search
    CPC ...... B60W 50/16; B60W 50/97; B60W 50/98; B60W 2550/143; B60W 2550/147;
    (Continued)

(56) References Cited

U.S. PATENT DOCUMENTS 7,302,327 B2 * 11/2007 Kudo ..................... B62D 1/286
                                                              180/6.2
7,663,495 B2 *  2/2010 Haque .................. B60K 28/066
                                                              180/272

(Continued)

FOREIGN PATENT DOCUMENTS

DE   10 2012 005 882 A1   11/2012
DE   10 2011 084 903 A1    4/2013
(Continued)

OTHER PUBLICATIONS

PCT/EP2017/070471, International Search Report dated Nov. 20, 2017 (Three (3) pages).

*Primary Examiner* — Phung Nguyen
(74) *Attorney, Agent, or Firm* — Crowell & Moring LLP (57) ABSTRACT

A method, apparatus and computer program for producing driver information, where at least some of the driver information is produced in the form of haptic driver information on a control means of a vehicle, includes ascertaining a measure of a haptic contact between the driver of the vehicle and the control means for controlling the vehicle and producing the driver information based on the ascertained measure of the haptic contact between the driver and the control means on the control means as haptic driver information and/or producing auxiliary driver information that corresponds to the driver information and that is perceptible to the driver via a different perception channel.

18 Claims, 1 Drawing Sheet

(51) Int. Cl.
  *B60C 9/00* (2006.01)
  *B60W 50/00* (2006.01)

(52) U.S. Cl.
  CPC ... *B60W 50/0098* (2013.01); *B60K 2370/158* (2019.05); *B60W 2540/00* (2013.01); *B60W 2552/20* (2020.02); *B60W 2555/00* (2020.02)

(58) Field of Classification Search
  CPC ... B60W 2550/402; B60W 50/14; B60Q 9/00; B62D 1/046; B62D 15/029; B62D 1/06; G06F 3/016; G06F 3/0414; G08B 6/00
  USPC ..... 340/435, 436, 438, 407.1, 903; 345/156, 345/173; 701/41, 301, 36
  See application file for complete search history.

(56) References Cited

U.S. PATENT DOCUMENTS

| | | | | |
|---|---|---|---|---|
| 8,451,109 | B1 * | 5/2013 | Daniel | B60K 28/066 340/439 |
| 9,703,289 | B2 * | 7/2017 | Sato | B60K 28/06 |
| 10,963,967 | B1 * | 3/2021 | Lafeir | G06Q 40/08 |
| 2008/0174415 | A1 * | 7/2008 | Tanida | B60Q 9/00 340/438 |
| 2009/0143941 | A1 * | 6/2009 | Tarasinski | A01D 41/127 701/41 |
| 2011/0279380 | A1 * | 11/2011 | Weber | G06F 3/016 345/173 |
| 2012/0056848 | A1 * | 3/2012 | Yamano | G06F 3/0236 345/174 |
| 2012/0126965 | A1 * | 5/2012 | Sanma | B62D 1/046 340/438 |
| 2013/0271293 | A1 * | 10/2013 | Jerusalem | B60Q 9/00 340/905 |
| 2015/0197283 | A1 | 7/2015 | Marti et al. | |
| 2015/0307022 | A1 * | 10/2015 | Nelson | B60W 50/16 701/36 |
| 2016/0107570 | A1 * | 4/2016 | Modarres | B60Q 9/008 340/435 |
| 2017/0031442 | A1 * | 2/2017 | Dabic | B60K 37/06 |

FOREIGN PATENT DOCUMENTS

| | | |
|---|---|---|
| DE | 10 2012 210 300 A1 | 12/2013 |
| EP | 2 716 501 A1 | 4/2014 |
| WO | WO 2015/092163 A1 | 6/2015 |

* cited by examiner

METHOD, APPARATUS AND COMPUTER PROGRAM FOR PRODUCING AND TRANSMITTING A PIECE OF DRIVER INFORMATION

CROSS REFERENCE TO RELATED APPLICATIONS

This application is a continuation of PCT International Application No. PCT/EP2017/070471, filed Aug. 11, 2017, which claims priority under 35 U.S.C. § 119 from German Patent Application No. 10 2016 216 590.9, filed Sep. 1, 2016, the entire disclosures of which are herein expressly incorporated by reference.

BACKGROUND AND SUMMARY OF THE INVENTION

The invention relates to a method, an apparatus and a corresponding computer program product for producing and transmitting driver information in a vehicle, wherein at least part of the driver information is produced and transmitted in the form of haptic driver information on a control means of a vehicle, in particular on a manual control means.

A motor vehicle today usually has a multiplicity of driver assistance systems that assist the driver of the vehicle in driving the vehicle. Some inherently known driver assistance systems in this case use the steering wheel of the vehicle to transmit a warning to the driver, for example by vibrating the steering wheel. In this case, haptically perceptible measures can be taken on the steering wheel, e.g. an indication that a current lane is being left can be transmitted by means of a vibration.

To accompany the increase in the significance of driver assistance systems and diverse, in some cases safety-relevant, automated interventions in the driving of a vehicle, the demands on safe and also easily and unambiguously interpretable signaling to the driver of the vehicle are also rising. Demonstrating an improvement over the prior art in this regard is the object of the present invention.

This object is achieved by the independent claims. Advantageous embodiments are specified in the dependent claims.

According to one aspect, a method for producing driver information in a vehicle is described, wherein at least part of the driver information is produced as haptic driver information on a control means of the vehicle, comprising: ascertaining a measure of a haptic contact between the driver of the vehicle and the control means for controlling the vehicle; and producing the driver information on the basis of the ascertained measure of the haptic contact between the driver and said control means as haptic driver information and/or producing auxiliary driver information, which corresponds to the driver information and is perceptible by the driver via another perception channel, on the basis of the ascertained measure of the haptic contact.

The driver information can be produced on said control means of the vehicle preferably such that the haptic driver information is perceptible on the control means haptically by the hand of the driver. The production of applicable physical influences, e.g. vibrations for the haptic driver information, which are likewise addressed in the invention, can be produced by means of the actuation of one or more (different) actuators inside and/or outside the control means. In this case, the driver information can be produced on the basis of the ascertained measure of the haptic contact by means of actuation of different actuators inside and/or outside the control means.

In other words and in simple terms, it is possible to ascertain how a measure (or multiple different) measures of a haptic contact between the driver and said control means (for example the steering wheel) is in relation to a relevant time interval. Driver information can then be produced, in particular adjusted, such that it is perceived and interpreted safely and in good time by the driver. In this case, the method can involve both production, in particular adjustment, of said haptic driver information and production, in particular adjustment, of other driver information, in particular production, in particular adjustment, of auxiliary driver information corresponding to the driver information on the basis of one or more ascertained measures of the haptic contact.

The driver information, in particular the actual message of the driver information, can in this case be information from a driver assistance system, navigation system, environment detection, etc. It can also be driver information related or not related to controlling the vehicle, using the control means of the vehicle.

The haptic driver information can in this case be produced on a manual control means, in particular on a steering wheel, that the driver uses to control the vehicle by means of a physical action or touch. In particular, the control means is a manual control means for controlling the transverse guidance of the vehicle (for example in the form of front-wheel and/or rear-wheel steering), wherein the control means can be in the form of a steering wheel (or bar ends) of a passenger car or as handlebars of a bicycle, e.g. motorcycle.

The haptic driver information can be or represent a vibration and/or a brief (variable) force, in particular a torque or an oscillation of the control means in the direction of rotation about the axis thereof ("rotary oscillation") on the manual control means. Besides a manual control means, however, the present invention is also implementable on a control means of the vehicle that is controllable by the feet of the driver, in particular a pedal; that is to say that said control means can thus also be an accelerator pedal and/or a brake pedal of the vehicle.

Further, it should be pointed out that the term "haptics" is intended to be understood generally and therefore also covers tactile perception (by the driver of the vehicle) generally, so long as the signal transmission is effected on a control element of the vehicle, such as the steering wheel or a general steering handle or a pedal, toward the driver by means of suitable production of a stimulus in the driver. Alternatively or additionally, the term "haptics" or haptic driver information can also be understood to mean (accordingly light) driver information transmitted to the skin of the driver by means of electric current stimulation. In this case, one or more different types of driver information can be produced by means of current stimulation that is weak, variable and matched to human perception, e.g. as impulses or voltage patterns. By way of example, it can be stimulation with electric current that causes a slight muscle contraction. In this case, almost haptic perception could be caused or simulated when the control means is touched or gripped.

The measure of the haptic contact between the driver of the vehicle and a control means can preferably represent one of the following variables: a measure of the contact area, in particular between the hand (palm) of the driver and the steering wheel of the vehicle, and/or a pressure, in particular as the entire contact pressure and/or pressure distribution and/or as pressure per contact area and/or—regions of the palm that (in the relevant time interval) are in or will probably be in haptic contact with the control means of the vehicle in the relevant time interval, and/or regions of the control means of the vehicle that (in the relevant time interval) are in or will probably be in haptic contact with the driver. Particularly preferably, the method involves two or more different measures of the haptic contact being taken into consideration.

Said driver information, or at least the component of the driver information that is transmitted by means of the haptic contact between the driver and the control means, can in particular be produced in order to warn a driver of the vehicle or to give an instruction pertaining to recommended and/or not recommended actions. By way of example, the haptic driver information can be produced in connection with the lane profile of the lane travelled on by the vehicle at present or in the near future and/or with the tracking and/or lane changing of the vehicle. It can also be driver information in connection with a lateral distance of the vehicle from an obstacle or road user or in connection with a risk of collision with an obstacle, e.g. from one particular side, if the risk of collision rises or exceeds a predetermined measure. Further, the driver information can be information related to the driving of the vehicle and/or to vehicle operation and/or navigation of the vehicle.

The invention also includes observing that a measure of the haptic contact can be described or represented by parameters of a pressure pattern and/or by means of a measure of a capacitive and/or inductive value between the control element and the driver (for example one or two palms of the driver). In this case, the measure of the capacitive contact and/or inductive contact can be detected by means of a capacitive sensor integrated in the steering wheel of the vehicle and/or by means of a steering wheel heating wire, for example. Alternatively or additionally, the (physical) pressure or the pressure distribution of the hand (or of the palms) of the driver on the manual control element can be detected. In fact, the driver information can then also be produced on the basis of one or more pressure values and/or capacitance values or a change in the pressure values and/or capacitance values that are caused on the steering wheel of the vehicle by one or two hands of the driver.

The producing of the haptic driver information in the method also comprises the adjusting of this haptic driver information. This can be adjusting one or more parameters of the haptic driver information before the driver information is actually output and/or adjusting one or more parameters of the haptic information while this information is output.

Further, the method can also comprise a negative decision regarding the producing of driver information or of the haptic part of the driver information. By way of example, the measure of the haptic contact between the driver and the control means can be taken as a basis for deciding about not producing haptic driver information on the control means of the vehicle, for example if said control means is not in or not in sufficient haptic contact with the driver of the vehicle. It is then possible for, by way of example, further expediently suitable, in particular non-haptic auxiliary driver information to be produced, in particular adjusted.

According to an advantageous development of the method, the amplitude and/or frequency and/or the duration of the haptic driver information produced can be adjusted on the basis of the ascertained measure of the haptic contact between the driver of the vehicle and a control means, in particular the control means for controlling the vehicle. By way of example, a greater amplitude and/or duration of the haptic signal produced can be chosen for a lesser contact. Further, the frequency of the haptic driver information can be varied, in particular such that frequencies are chosen that are particularly suitable for a desired transmission of stimulus for the ascertained measure of the haptic contact (e.g. for a large, average or small contact area and/or contact pressure). In this case, it is also possible to take into consideration that particular measures or extents of the haptic contact, e.g. a relatively large-area but low-pressure haptic contact, can result in particular vibration frequencies being felt as very unpleasant or as overstimulation.

According to an advantageous development of the method, a vibration parameter in the vehicle can be ascertained as a measure of vibrations prevailing in the vehicle at present or in the near future, and this can be taken as a basis for adjusting the amplitude and/or frequency of the haptic driver information, and/or for adjusting a time interval or a starting time for output of the haptic driver information, and/or for moving the production, in particular transmission, of at least part of the haptic driver information to other parts of the vehicle. In this case, it is also possible for an at least partial movement, in particular splitting of the production of at least part of the driver information, to be effected on the basis of the ascertained vibration parameter in the vehicle and/or on the basis of the ascertained measure of the haptic contact between the driver of the vehicle and the control means of the vehicle. In this case, it is also possible for a mathematical relationship between haptically transmitted driver information and non-haptically transmitted driver information to be adjusted, e.g. in small steps.

It is also possible for different aspects of the production of the driver information to be adjusted, in particular the ascertained measure of the haptic contact and/or the vibration parameter in the vehicle can be taken as a basis for an electronic control unit to decide to produce the driver information on different parts of the vehicle and/or using different means, in particular actuators. By way of example, that component of haptic driver information that is produced inside the steering wheel of the vehicle and the component of the haptic driver information that is produced e.g. by means of actuation of power steering of the vehicle can be adjusted in suitable fashion.

Preferably, the auxiliary driver information, in particular haptic auxiliary driver information, can be produced on another part of the vehicle with which the driver is in a haptic contact, in particular with a sufficient measure of the haptic contact, in the relevant time interval.

According to the invention, the production and transmission of the haptic driver information can be at least partially moved to another control means of the vehicle. By way of example, if it is ascertained that the driver does not grip the steering wheel of the vehicle adequately with his hand or hands, the haptic driver information or the auxiliary driver information can be produced on at least one other control means, for example on a pedal of the vehicle. As such, haptic driver information can be produced on that pedal of the vehicle with which the driver is currently in adequate haptic contact.

Said vibration parameter in the vehicle can be a vibration occurring on said control means for controlling the vehicle, for example. Such a vibration can be ascertained e.g. by means of a sensor installed on or in proximity to the control means. By way of example, the vibration parameter in the vehicle can also be detected by means of a sensor that is already present in the control means.

Further, the vibration parameter in the vehicle can also be further vibration information not or not directly perceptible by means of said control means. Such a vibration parameter in the vehicle can be noticeable to the driver e.g. by means of further vehicle parts with which the driver is in contact.

It is alternatively possible for vibration parameters in the vehicle to be taken into consideration that are perceived via further nerves (not in the hands) of the driver or via one or more other perception channels of the driver.

The vibration parameter in the vehicle can also be ascertained by means of one or more microphones in the vehicle. In this case, it is possible to use e.g. microphones already provided in the vehicle that are used for mobile communication (handsfree device) or voice control. It is also possible for a mode of operation and/or power of the music from an infotainment system of the vehicle, in particular a component of low frequencies (bass), to be ascertained and taken into consideration as a vibration parameter in the vehicle.

Typically, some of the vibration parameters in the vehicle that actually occur or the measure of vibrations in the vehicle are/is also highly dependent on the condition, in particular unevennesses, of a road that the vehicle travels on (in the relevant time interval, at present and/or in the future).

Such vibration information can be ascertained, according to the invention, on the basis of information about the condition (more simply: quality) of the road (travelled on at present or in the future). The condition of the road can be ascertained from a digital navigation map and/or sensor data of an ambient sensor of the vehicle that is configured to detect a road travelled on by the vehicle (at present or in the future); further from sensor data of a vertical dynamic sensor of the vehicle and/or sensor data of an inertial sensor and/or acceleration sensor of the vehicle and/or sensor data of a motion and/or force sensor on a, for example manual, control means of the vehicle. In this case, a further advantage that possibly arises is that the producing of the driver information can be planned in advance, e.g. a few seconds or fractions of seconds in advance. Particularly preferably, the condition of the road can be taken into consideration in the form of a relevant section of what is known as a road profile.

When ascertaining this type of vibration parameter in the vehicle, a measure of the damping or transfer of the vibrations arising on the wheels of the vehicle by the chassis of the vehicle, in particular by a steering line of the vehicle, can also be taken into consideration in suitable fashion. By way of example, it is also possible for a setting (valid in the relevant time interval) of the chassis of the vehicle, e.g. sport, normal, comfort, off road, etc., to be taken into consideration.

In an advantageous development, the method comprises producing haptic driver information on the control means of the vehicle on the basis of the ascertained measure of the haptic contact and/or on the basis of the ascertained vibration parameter in the vehicle, wherein the driver information is either brought forward in time or put back in time, and/or is adjusted to suit a particular time interval. Particularly preferably, the producing of the haptic driver information can be adjusted to suit a particular time interval, wherein the time interval, in particular the starting time and the end time, is chosen on the basis of the traffic situation and/or on the basis of environment detection by sensor.

In an advantageous development, the method can involve a pattern, in particular an amplitude pattern and/or frequency pattern, of the haptic driver information being chosen and/or adjusted on the basis of the ascertained one measure of a haptic contact between the driver and the control means for controlling the vehicle and/or on the basis of the ascertained vibration parameter in the vehicle. This can be particular patterns, in particular predetermined patterns. Preferably, a suitable pattern is selected from a number of prefabricated patterns and appropriate haptic driver information is produced.

In an advantageous development of the method, the or a measure of a haptic contact between the driver and the control means and/or the ascertained vibration parameter in the vehicle is/are taken as a basis for the driver information being at least partially moved to at least one other perception channel of the driver, referred to in the present case as auxiliary driver information. In this case, the auxiliary driver information is supposed to comprise a content whose sense matches the original driver information or to comprise a message that is substantially concordant with said original driver information. As such, the auxiliary driver information can comprise a recommendation for action, orientation information or an indication of a particular direction that originally planned driver information also had or would have had.

The auxiliary driver information can be driver information that serves the same purpose as the haptic driver information on the control means of the vehicle. By way of example, at least partial movement of the driver information comprises driver information having the same or a similar meaning or driver information serving the same purpose being output by means of a visual display and/or by means of audible information instead of or in addition to the haptic driver information.

The method according to the invention can comprise the following steps: taking the ascertained measure of the haptic contact as a basis for ascertaining whether a predefined transmission of stimulus (e.g. that is at least adequate and/or below a predetermined value) and/or timely receipt of the haptic driver information by the driver can be ensured, and varying the haptic driver information such that a predefined transmission of stimulus and/or timely receipt of the haptic driver information is/are ensured with adequate (high) probability, and/or moving at least part of the driver information if adequate transmission of stimulus and/or timely receipt of the driver information is/are not probable.

In this case, different driver information or content of the driver information can have different probability thresholds defined for it at which said driver information or content can be received (perceived) by the driver in timely fashion in each case.

The method further comprises producing auxiliary driver information, which is not produced on a manual control means. In this case, the content of the driver information can be adjusted on the basis of the measure of the haptic contact with the control means. In particular, the method can comprise producing the driver information, which is split into a haptic component and a non-haptic component. In this case, the split of the driver information can be adjusted on the basis of the ascertained measure of the haptic contact, in particular in real time.

The producing of the driver information can be adjusted such that the applicable communication message (from the vehicle to the driver) can be reliably transmitted even in the absence of haptic contact and/or in the event of strong vibrations in the vehicle (in particular in the event of strong other vibrations on the manual control means). The method can also involve two or more pieces of driver information with different meanings being produced, wherein parameters used to produce said pieces of driver information are adjusted such that the two or more pieces of driver information will be distinguishable from one another better or despite interfering influences or a variable haptic contact.

Further (possibly at the same time), the adjustment of the driver information, in particular of the haptic driver information, can effectively prevent disadvantageous disturbance of the driver or of another occupant on the basis of the haptic driver information. Preferably, vibrations in the vehicle in a frequency range of 0.1-1000 Hz, in particular of 0.5-300 Hz, are taken into consideration in suitable fashion in this case. These are the vibrations typical of motor vehicles such as passenger cars, which can have a considerable influence on a human perception channel for the perception of haptic stimuli.

In particular, the haptic driver information can be a directional force that is variable over time, in particular a directional (haptically perceptible) torque that is variable over time or an oscillation of the control means in the direction of rotation about its own axis ("rotary oscillation"), which torque/oscillation is transmitted to said control means, in particular steering wheel of the vehicle. In this case, the torque for haptic driver information can be produced in accordance with a predetermined time function, in particular asymmetrically for the steering directions left and right. The haptic driver information can in this case also comprise one or more substantially constant or slowly varying force(s) or a constant or slowly varying torque, or can be combined with such a force/torque. In this case, the direction and/or frequency and/or amplitude of the force can also transmit one or more particular pieces of information for the driver of the vehicle, in particular via his haptic perception channel. Multiple pieces of driver information can be distinguishable driver information. In this case, two or more different pieces of driver information can be coded by direction and/or frequency and/or amplitude and/or particular (driver-distinguishable) patterns of the force.

Preferably, the haptic driver information can be produced as a steering wheel vibration and/or a directional torque of the steering wheel of the vehicle. Haptic driver information of this kind can be produced by means of the actuators of a power steering system, for example, and/or by a further actuator, e.g. an unbalanced mass actuator, e.g. inside the steering wheel or manual control means. The haptic driver information can have e.g. at least one substantial frequency component in a frequency range of 1-40 Hz, preferably 12-30 Hz. Haptic information of this kind can be perceived by the driver of the vehicle particularly quickly, e.g. via his hands on the steering wheel. As a result of the haptic information being produced on a manual control means of a vehicle, information transmitted to the driver in this way can be intuitively "grasped" particularly quickly by the driver of the vehicle and if need be converted into an action.

Preferably, the method according to the invention can also involve a (general or specific) state of alertness of the driver, his line of vision and/or the attentiveness of the driver being taken into consideration. In this case, e.g. averted eyes of the driver and an inadequate measure of the haptic contact with the manual control means (handlebars, steering wheel) of the vehicle can result in driver information being produced on a (currently operated) pedal or knob of the vehicle. The driver information, in particular the auxiliary driver information, can be produced on a pedal, for example by means of actuation of what are known as force feedback actuators. The auxiliary driver information can be produced on one of the (by way of example) two pedals of the vehicle with which the foot of the driver has an (adequate) measure of the haptic contact.

The driver information can be driver information output by a driver assistance system or by a system for active safety. Particularly preferably, it is information to assist the driver in driving the vehicle, in particular in transverse guidance of the vehicle. Preferably, the driver information can be produced on the basis of environment information detected and interpreted using means of the vehicle.

The driver information can in this case transmit or represent one or more different warnings, recommendations for action or other information to the driver of the vehicle. By way of example, the driver information can represent pertaining to position of the vehicle in relation to lane markings and/or mobile or immobile obstacles in the surroundings of the vehicle. Further, at least one parameter pertaining to production of the haptic information, for example the frequency, amplitude, patterns of the haptic action, can be chosen on the basis of the importance, urgency and/or criticality of the driver information.

A manual control means can preferably be a control means for steering the vehicle (steering wheel of a motor vehicle, handlebars of a motorcycle or a comparable apparatus). Alternatively, the control means can comprise other control elements (possibly not of round shape) for driving the vehicle, the continuous force on the control element being converted into a continuous odometric variable. Application of the method to the steering wheel is particularly advantageous because the latter is held by the haptically very sensitive palms of the driver.

Alternatively, the control means can also be a pedal of the vehicle, e.g. an accelerator pedal and/or brake pedal of the vehicle. In this context, the haptic information can be taken to be a vibration or force from the pedal on the foot of the driver, for example. Further, the control means can also be a combined control means for controlling the vehicle transverse guidance and/or the vehicle longitudinal guidance and/or for maneuver control by the driver, such as e.g. a "joystick" or a corresponding development. Alternatively or additionally, the control means could be a knob, in particular a universal rotary pushbutton.

The haptic driver information can comprise one or more frequency components having a respective amplitude and a respective frequency. The amplitude and/or frequency of the one or more frequency components of the haptic driver information can then be adjusted on the basis of the vibration parameter in the vehicle. In particular, it is possible to achieve the effect that the haptic driver information comprises at least one frequency component having a particular frequency that has an amplitude higher than the amplitude of a frequency component having the particular frequency of the vibrations of the vehicle. The spectral energy, or a spectral split of the energy of the haptic driver information, can be shifted to frequency ranges in which (in accordance with the ascertained vibration parameter in the vehicle) the vibrations in the vehicle have relatively little spectral energy. Particularly preferably, the method comprises to this end a shift in a spectral energy of the haptic driver information from one or more frequency ranges in which the vibrations in the vehicle have a relatively high level of spectral energy (and hence can exert an increased interfering influence on the haptic driver information) to one or more frequency ranges in which the vibrations in the vehicle have relatively little spectral energy. In this case, the method can also comprise a distribution of the haptic driver information e.g. to at least two different frequency ranges on the basis of the ascertained vibration parameter in the vehicle.

In particular, the haptic driver information can be adjusted such that the haptically transmitted stimulus has a, for human beings, perceptibly higher level of spectral energy in a particular frequency range than the vibrations in the vehicle. Alternatively or additionally, a correlation between the frequency spectrum of the haptic driver information and the vibrations of the vehicle can be at least reduced and preferably minimized. As such, it is possible to ensure that the haptic driver information can be reliably perceived by the driver of the vehicle.

The method according to the invention can also comprise ascertaining a present and/or predicted speed of travel of the vehicle. The vibration parameter in the vehicle can then be dependent on the present and/or predicted speed of travel of the vehicle or the vibration parameter in the vehicle can take into consideration the present and/or predicted speed of travel of the vehicle. The haptic driver information can then be produced or adjusted on the basis of the speed of travel. In particular, a spectral composition of the haptic driver information can be dependent on the speed of travel. As such, it is possible to ensure that the haptic driver information can be perceived by the driver in a reliable manner even at different speeds of travel.

The method according to the invention can comprise predicting the measure of the haptic contact between the driver of the vehicle and the (for example manual) control means. In this case, the features of the method can be designed or adjusted on the basis of or for the future driver information in advance as appropriate. The measure of the haptic contact between the driver and the control means can also be predicted on the basis of a predicted traffic situation for a near future and/or on the basis of a predicted degree of automation of a vehicle travelling in at least partially automated fashion. By way of example, if the degree of automation rises or is identified as rising, it can be assumed that there tends to be less haptic contact with the palm of the driver.

An intensity and/or an amplitude of the haptic driver information can rise as a measure of unevennesses of the road travelled on rises. Alternatively or additionally, an intensity and/or an amplitude of the haptic driver information can rise as a speed of travel rises. Alternatively or additionally, an intensity and/or an amplitude of the haptic driver information can rise with a combinational value (e.g. with a product) comprising the measure of road unevennesses and the speed of travel. As such, it is possible to ensure that the haptic driver information can be perceived by a driver in a reliable manner even in different travel situations.

The vibration parameter in the vehicle can represent a present measure of vibrations of the vehicle and a predicted future alteration in the measure of vibrations of the vehicle. In this case, the predicted future alteration in the measure of vibrations of the vehicle can be dependent in particular on a planned trajectory of the vehicle. As such, the haptic driver information can already be adjusted in advance, so that the reliability of the perception is increased further. The trajectory of the vehicle is intended to be understood in this context to mean in particular the trajectory of the center, of the contour, of the wheels, etc. of the vehicle, e.g. relatively to road unevennesses, road edge, ruts, etc.

At least one vibration parameter in the vehicle can also be ascertained on the basis of acoustic oscillations, e.g. music, noise, various signals, in particular on the basis of a level of acoustic oscillations, in the interior of the vehicle. By way of example, an interior microphone can be used to detect acoustic oscillations in the interior of the vehicle. In addition, the spectral energy of an acoustic signal in a frequency range relevant to the perception of haptic driver information (e.g. of 100 Hz, 50 Hz or less) can be ascertained. The producing of the driver information can then be adjusted on the basis of the amplitudes, frequencies or spectral energy distribution in particular frequency ranges. As such, further sources of vibration can be taken into consideration in order to improve the quality of the perception of the haptic driver information.

The haptic driver information can be output in an upcoming (i.e. future) time interval. The ascertaining of the vibration parameter in the vehicle can comprise the ascertaining of parameters of vibrations for at least part of the upcoming time interval. Therefore, adjustment of the haptic driver information can already be performed in advance, which means that the quality of the perception of the haptic driver information can be improved further.

The haptic driver information can be produced or adjusted such that the haptic driver information is above a first perceptibility threshold for a driver of the vehicle, wherein the driver is touching the (for example manual) control means. Alternatively or additionally, the haptic driver information can be produced or adjusted such that the haptic driver information is below a second perceptibility threshold for a further occupant of the vehicle who is not touching the control means. The first perceptibility threshold and the second perceptibility threshold can in this case be ascertained on the basis of the ascertained haptic contact between the driver of the vehicle and the control means of the vehicle. Further, the first perceptibility threshold and/or the second perceptibility threshold can also be ascertained on the basis of the vibration parameter in the vehicle. By way of example, families of characteristic curves for perceptibility thresholds can be ascertained (e.g. on the basis of psychohaptic tests) that indicate the first and/or second perceptibility threshold as a function of the vibration parameter in the vehicle. It is then possible to ascertain for the ascertained vibration parameter in the vehicle a first perceptibility threshold for the driver of the vehicle and a second perceptibility threshold for a further occupant of the vehicle. The driver information and the auxiliary driver information can then be produced, in particular dimensioned, such that they are sufficiently above the first perceptibility threshold and are sufficiently below the second perceptibility threshold.

It is thus possible to increase the perceptibility and/or comfort for the driver or further vehicle occupants further.

A time characteristic of an amplitude and/or of a frequency of the haptic driver information can then be adjusted on the basis of the perceptibility threshold. In particular, it is possible to achieve the effect that a correlation between the time characteristic of the vibrations in the vehicle and the time characteristic of the haptic driver information is reduced, possibly minimized. As such, the quality of the perception of the haptic driver information can be improved further.

Further, the method can comprise producing at least two different pieces of haptic driver information, wherein the at least two pieces of haptic driver information transmit different information (messages) to the driver of the vehicle via at least one control means of the vehicle. In this case, the producing of at least two different pieces of haptic driver information having different meaning can be to a different extent on the basis of the ascertained vibration parameter in the vehicle or can be adjusted in the event of alteration of the vibration parameter in the vehicle. The two different pieces of driver information can be produced or adjusted (separately, i.e. each individually) in different ways on the basis of the measure of the haptic contact between the driver and the control means.

Thus, the method can be used to produce driver information (possibly comprising haptic driver information and non-haptic driver information, or auxiliary driver information output adaptively in the method) in the case of which information is transmittable more comfortably and more safely for the driver of the vehicle. Therefore, the (frequently overloaded) visual and acoustic perception channels of the driver and of the occupants in road traffic can be looked after. Further, it is possible for better (i.e. clear) distinguishability of at least two different pieces of haptic information or of at least two different measures of criticality of information by the driver in different situations to be produced.

By way of example, it is possible in this case for at least first haptic driver information for representing non-safety-relevant or less safety-relevant information and second haptic driver information for representing safety-critical information to be produced. In this case, the first, non-safety-critical driver information can be produced on the basis of the ascertained vibration parameter in the vehicle such that there is no uncomfortable effect on the perception of the driver. In this case, the second, safety-critical driver information can be produced on the basis of the ascertained vibration parameter in the vehicle such that it has a high probability of being perceived and/or is safely distinguishable from the first driver information.

According to a further aspect, the invention comprises an apparatus for a vehicle. The apparatus is configured to ascertain a measure or multiple measures of the haptic contact between the driver and the control means of the vehicle and/or to ascertain a vibration parameter in the vehicle for the purposes of the method described above. Additionally, the apparatus is configured to prompt the ascertained measure of the haptic contact and/or the ascertained vibration parameter in the vehicle to be taken as a basis for producing, in particular adjusting, haptic driver information on the control means and/or auxiliary driver information that corresponds to the driver information and is perceptible by the driver via another perception channel.

According to a further aspect, the invention comprises a vehicle (in particular a road motor vehicle, e.g. a passenger car, a truck or a bicycle, e.g. motorcycle) that contains the apparatus described in this document and in which the method described in the present case is carried out or able to be carried out. The vehicle is in particular a motor vehicle or bicycle, e.g. motorcycle. This results in numerous advantages that are discussed here and in further advantages that are not difficult for a person skilled in the art to comprehend. Alternatively, the method can also be applied to aircraft or watercraft.

According to a further aspect, the invention comprises a computer program, in particular a computer program product comprising the computer program, wherein the computer program is designed to perform, on a data processing apparatus of a vehicle or of a mobile user device, part of the method according to the invention or an advantageous configuration of the method according to one or more further features of the method when it is carried out. In particular, the computer program is a software program executable as an application on a control apparatus installed or located in the vehicle for example. Part of the control apparatus can be a mobile user device in this case.

The computer program or computer program product in this case comprises an executable program code that, when executed by a data processing apparatus, carries out at least part of the method according to an aspect described in the present case or an advantageous configuration of the method described in the present case. The computer program product can in this case be in the form of an update to a previous computer program that comprises the parts of the computer program or of the corresponding program code for an applicable control apparatus of the vehicle, for example as part of a function extension, for example as part of what is known as a remote software update.

It should be borne in mind that the methods, apparatuses and systems described in this document can be used either alone or in combination with other methods, apparatuses and systems described in this document. In addition, any aspects of the methods, apparatuses and systems described in this document can be combined with one another in a wide variety of ways. In particular, the features of the claims can be combined with one another in a wide variety of ways.

Other objects, advantages and novel features of the present invention will become apparent from the following detailed description of one or more preferred embodiments when considered in conjunction with the accompanying drawing.

BRIEF DESCRIPTION OF THE DRAWING

The invention is described in more detail below on the basis of an exemplary embodiment without limiting the generality. In this instance, the single FIGURE shows exemplary components of a vehicle that are able to be used to perform the method described in the present case for producing haptic driver information.

DETAILED DESCRIPTION OF THE DRAWING

Figure 1:
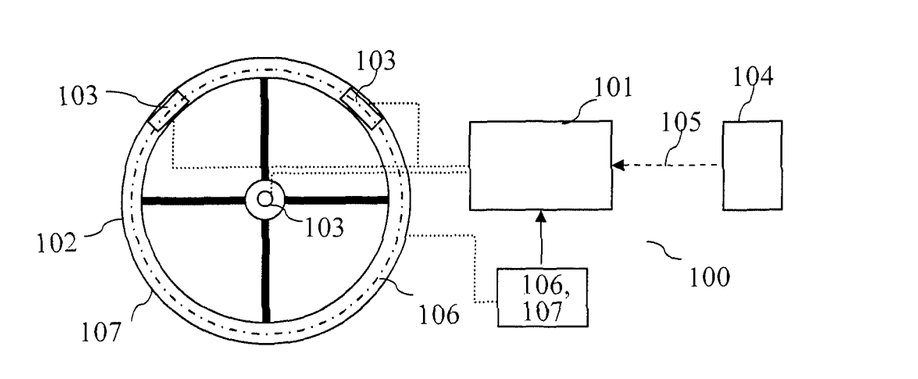

As stated at the outset, the present document is concerned with the reliable transmission of information to a driver of a vehicle via a, for example manual, control means (in particular via a steering wheel) of the vehicle, but alternatively also via another control means, for example a pedal. In this context, the single FIG. 1 shows exemplary components of a vehicle 100. In particular, FIG. 1 shows a steering wheel 102 of a vehicle 100 that the driver of the vehicle 100 can use to control the transverse guidance of the vehicle 100. The steering wheel 102 can in this case be regarded as an example of a manual control means of the vehicle 100. Alternatively or additionally, e.g. a joystick could be used as manual control means in order to drive the vehicle 100 as appropriate.

The steering wheel 102 comprises one or more haptic actuators 103 configured to generate a haptically perceptible signal (in particular a vibration) on the steering wheel 102, so that the signal can be detected by a hand of the driver of the vehicle 100. The one or more haptic actuators 103 can be actuated by a control unit 101 of the vehicle 100. By way of example, the one or more actuators 103 can be actuated in order to signal to the driver of the vehicle 100 that the vehicle 100 is leaving a present lane. The actuators 103 can be used to generate in particular steering wheel vibrations for transmitting information or warnings from different driver assistance systems. In this case, the steering wheel vibrations can be produced by means of unbalanced mass actuators 103 in the steering wheel 102 or by means of a power steering actuator 103. The strength of the steering wheel vibrations can be selected in a menu of a user interface of the vehicle 100 (e.g. on three levels) if appropriate.

Further, the steering wheel 102 also comprises one or more sensors 106, 107, which are integrated in the steering wheel 102 in the present example. These are denoted by a dash-dot line in the FIGURE. In the present example, this is what is known as a capacitive sensor mat. This can be what is known as a "hands-on sensor" and/or "hands-off sensor" that is known per se or developed for carrying out the method. Preferably, the sensor or a computation unit connected thereto can further be configured to identify or distinguish two or more patterns of the haptic contact.

Sensors 106 and 107 can also be configured as parts (areas) of a sensor that can preferably also deliver separate measured values. The sensor(s) 106, 107 can detect touching of the control means or steering wheel 102 and gripping of the control means/steering wheel 102. In this case, the data of the sensor 106, 107 can be used to ascertain on which side of the steering wheel 102, for example in the position of the reference numerals 106 and 107 that are shown, there is a haptic contact with the driver of the vehicle. Preferably, the haptic contact is represented by one or more determined coefficient(s) of measure or variable(s). In this case, a distinction can be drawn between a light (almost weak) touch of the control element 102 with one hand or with two hands and gripping of the control element 102 with one or two hands of the driver and an express coupling of force between the one or two hands of the driver and the control element 102, in particular represented by narrow and/or extensive contact or a transmitted friction force. Further, it is also ascertained if there is no or inadequate haptic contact between at least one hand of the driver and the control means/steering wheel 102, in particular if a predetermined measure required for transmitting or distinguishing (particular) haptic driver information is not fulfilled with an adequate haptic contact.

As a measure of the haptic contact between the driver of the vehicle and the control element, it is possible to use a measure, in particular a pattern (e.g. surface pattern and/or a timing pattern) representing a capacitive coupling caused by one and/or two hands of the driver, for example. Alternatively, it is also possible to use an inductive sensing principle for this purpose. In one embodiment, it is alternatively or additionally possible to use a camera system in the interior of the vehicle in order to detect the measure of the haptic contact between the hands of the driver and the control element, e.g. by means of optical object recognition.

A measure of a haptic contact between the driver of the vehicle and the control means for controlling the vehicle is ascertained. Driver information comprising at least one piece of haptic driver information to be transmitted is produced. The method then involves deciding whether and which component of the driver information is output on the manual control means, in this case on the steering wheel 102, specifically on the basis of the ascertained measure of the haptic contact between the driver of the vehicle and the control means 102 for controlling the vehicle.

In this example, it is possible for multiple (basically) different measures of the haptic contact to be ascertained and taken into consideration, namely a haptic contact with the control means by a hand or by two hands, and/or the gripping or non-gripping of the control means with or without the strength and the position of the grip. Moreover, manipulation of the manual control means by means of the haptic contact, and/or a pressure distribution or pressure distribution pattern.

The method can further comprise the following: ascertaining driver information to be transmitted, ascertaining whether there is a predetermined measure of a haptic contact, outputting said driver information if it is identified that there is adequate haptic contact (on the basis of the ascertained measures of the haptic contact), and possibly waiting, in particular for a maximum prescribed period, until the predetermined adequate measure of the haptic contact is produced, and then outputting the driver information as soon as it is identified that there is adequate haptic contact, or the driver information is then output in an altered form, in particular via another perception channel of the driver.

If the vehicle is moved on an uneven or poor road, there is the possibility in particularly adverse cases that a steering wheel vibration intended to be used to transmit driver information will remain unnoticed by the driver. On the other hand, on a very smooth, even road, (relatively strong) steering wheel vibrations for transmitting driver information can be felt as a disturbance by the driver of the vehicle 100. Such steering wheel vibrations could then possibly also be perceived as a disturbance by another occupant of the vehicle. Thus, adaptive adjustment of the haptic driver information of a manual control means 102 of a vehicle 100 (e.g. on the basis of the unevennesses of the road travelled on, which are known from a road profile) is proposed. In this case, the haptic driver information can be adjusted on the basis of one or more factors influencing a human perception of the haptic driver information.

In this example of the method, multiple (basically) different types of the vibration parameters 105 of the vehicle or in the vehicle are ascertained and taken into consideration. Parameters for vehicle vibrations, e.g. on the basis of a present mode of operation or performance of the vehicle motor for the power steering, etc., are ascertained. Vibrations in the vehicle are ascertained that arise on account of the unevennesses in the road, and are forwarded to the passenger compartment and/or the steering line of the vehicle by the chassis of the vehicle. Vibrations in connection with loud music in the interior of the vehicle, in particular the power of the bass components and/or rattling in the interior of the vehicle, are ascertained.

In particular, the vehicle 100 can comprise a sensor 104 configured to detect a vibration parameter 105 in the vehicle 100 (and in particular in relation to vibrations on the manual control means 102 of the vehicle 100). The control unit 101 can be configured to actuate the actuators 103 of the manual control means 102 on the basis of the measure of the haptic contact and/or on the basis of the ascertained vibration parameter 105. In particular, the strength of the driver information generated by an actuator 103 can be increased if the vibration parameter 105 indicates a relatively large measure of vibrations in the vehicle 100 (in particular on the manual control means 102) in combination with an inadequate measure of the haptic contact.

On the other hand, the strength of the driver information generated by an actuator 103 can be reduced if the vibration parameter 105 indicates a relatively small measure of vibrations in the vehicle 100 (in particular on the manual control means 102). As such, it is possible to ensure that haptic driver information via a manual control means 102 of a vehicle 100 can be detected by a driver of the vehicle 100 in a reliable and comfortable manner.

A corresponding method for producing haptic driver information in the vehicle 100 comprises ascertaining a vibration parameter 105 or corresponding information indicating an e.g. cumulated measure of vibrations in the vehicle 100. Additionally, the method comprises producing or adjusting haptic driver information on the, in this case manual, control means 102, in particular on the steering wheel, on the basis of the ascertained measure of the haptic contact and/or on the basis of the vibration parameter 105.

The haptic driver information can in particular comprise a warning or informative vibration on the steering wheel 102 that is produced e.g. on the basis of possible crossing of a road marking or on the basis of a risk of (side) collision. In addition, the haptic driver information can comprise a directional vibration of the steering wheel 102 that is produced in specific fashion by means of the actuators 103 and for which a force and/or a resistance in a first steering direction of rotation and in a second steering direction of rotation differ. In this case, the first and/or second direction(s) of rotation can transmit information about a recommended or not-recommended steering direction of rotation to the driver.

The vibrations in the vehicle 100 that are detected by means of the vibration parameter 105 can comprise in particular vibrations that are present on the steering wheel 102 of the vehicle 100 and are independent of the vibrations produced by the actuators 103. Preferably, vibration parameters in the vehicle in the frequency range of 0.5-50 Hz are taken into consideration. Preferably, multiple (basically) different types of the vibrations in the vehicle are taken into consideration.

The measure of ascertained or predicted vibration parameters 105 can comprise an amplitude value and/or a frequency value and/or a cumulated perception value. The vibration parameter 105 can in this case be ascertained or estimated in advance for a time interval in the near future. A measure ascertained or estimated in advance for the vibration parameter 105 in the time interval for the intended output of haptic signaling to the driver (as driver information) can in this case also be dependent on the present (or currently measured) measure of the vibrations in the vehicle 100. In particular, the at least one vibration parameter 105 can be consistent on the basis of the present (or currently measured or estimated) measure of vibrations in the vehicle 100, in particular if a substantial alteration in this measure has not been ascertained in advance.

The varying of the haptic driver information can comprise changing over multiple intensity levels of the driver information to be transmitted. Preferably, the parameters of the haptic driver information can be adjusted largely continuously over time and/or in small (barely perceptible) (parameter) steps to suit the vibration parameters 105 that are to be expected.

The vibration parameter(s) 105 can be ascertained or estimated on the basis of a measure of the road unevennesses in the surroundings of the vehicle 100, in particular in a road section on the probable vehicle trajectory of the vehicle 100. Particularly preferably, the measure of unevennesses relates to a road section travelled on in that time interval in which the haptic driver information is also output or is yet to be output.

A measure of road unevennesses can be ascertained on the basis of different information, for example on the basis of information about the road condition (more simply: a measure of road quality) from a navigation map and/or on the basis of sensor data from at least one vehicle sensor, in particular a front camera system of the vehicle and/or sensor data of at least one vertical dynamic sensor (in particular one for detecting vertical effects, tilting, swaying, distribution of the forces acting on the wheels, etc.) and/or on the basis of sensor data of at least one inertial sensor (acceleration sensor) of the vehicle 100 and/or on the basis of sensor data from a steering wheel sensor of the vehicle and/or detected force influences or frequency values of the influences on a power steering system of the vehicle. A particular preference in this case is a combined approach in which a present vibration parameter 105 is ascertained in particular by sensor and information of an environment-detecting sensor of the vehicle about a (forthcoming or expected) alteration in the measure representing the road unevennesses on the planned vehicle trajectory is taken into consideration.

As set out further above, it is in particular possible for an amplitude and/or a frequency value of haptic driver information that is to be transmitted to be varied in a manner adjusted on the basis of the vibration parameter 105. Particularly preferably, the haptic driver information can be varied in suitable fashion on the basis of the two parameters amplitude and frequency. In this case, the haptic driver information can comprise two or more frequency components or a frequency pattern. The frequency values can in this case comprise spectral parameters, e.g. for two or more frequencies.

The haptic driver information, in particular a frequency of the haptic driver information, can be varied on the basis of the present vehicle speed or the vehicle speed predicted for the near future. This is because a vibration frequency of the steering wheel 102 that is established to be the vibration parameter 105 and is caused by travelling on a road is typically dependent on the speed of travel of the vehicle. As a result, the quality of the perception of an additional vibration on the steering wheel produced artificially to transmit haptic driver information is also dependent on the vehicle speed. When travelling slowly, typically relatively low vibration frequencies (at relatively low frequencies) are generated, the vibration frequencies typically rising and altering their frequencies as the speeds of travel rise.

The artificially produced forces and vibration of the haptic driver information can be chosen or varied such that the haptic driver information is disturbed, for example overlaid, as little as possible by the vibration caused by the road unevennesses at the present speed of travel. Consequently, the haptic driver information can be dependent on the speed of travel of the vehicle and can be adjusted on the basis of the speed of travel. One or more frequencies of the artificially produced haptic driver information can be chosen such that a masking effect for the perception of the haptic driver information as a result of the vibrations in the vehicle is avoided. In this case, the frequency values similar to the frequency values of the vibrations in the vehicle can be avoided. In addition, differing frequency values can be preferred. As such, interference or "crosstalk" between the vehicle vibrations and the haptic driver information can be avoided in regard to human perception. Further, the method can also involve masking effects known from science of perception and psychooptics being taken into consideration.

The vehicle speed of the vehicle 100 that is predicted (e.g. for the next few seconds) can be ascertained from the present speed and positions of accelerator and/or brake pedals of the vehicle 100. The intensity of the steering wheel vibration for the haptic driver information can be substantially proportional to a product of a measure of road unevenesses and a speed value indicating the speed of travel of the vehicle. By way of example, a relatively low roughness of the road at a low speed of travel can lead to a relatively low intensity of the haptically transmitted driver information. In addition, a relatively high roughness at a relatively low speed of travel and a relatively low roughness at a relatively high speed of travel can lead to an average intensity of the driver information to be transmitted haptically. Additionally, a relatively high roughness of the road and a relatively high speed can lead to a relatively high intensity of the driver information to be transmitted haptically.

This adaptivity of the intensity of the driver information can also be dependent on an intensity setting chosen by a user, i.e. the driver of the vehicle. In this case, the intensity setting (intensity level) of the driver can be applied as a further multiplicative factor.

The vibration parameter 105 can indicate a time characteristic of an amplitude and/or of a frequency of vibrations in the vehicle. The vibration parameter 105 can in particular be ascertained by sensor. In this case, information of a vehicle-environment-detecting sensor about an alteration in the vibrations in the vehicle 100, in particular owing to altered road unevennesses in the vehicle surroundings in a direction of the planned vehicle trajectory, can be taken into consideration. Against the background of a measure of vibrations in the vehicle that is ascertained for the present time and against the background of a factor of the alteration that influences the vibrations in the vehicle (e.g. the road roughness in the time interval in which haptic driver information will (probably) be output), a measure of the vehicle vibrations 105 prevailing at that time can be reliably estimated.

The haptic driver information, in particular an amplitude and/or a frequency value of the haptic driver information, can be varied on the basis of a volume and/or a frequency value of a sound system of the vehicle or on the basis of a sound value measured by an interior microphone. Particularly preferably, the amplitudes or levels of low frequency values (50 Hz or below, 100 Hz or below, 200 Hz or below) and in particular in a frequency range of approximately 5-35 Hz are taken into consideration in this case. At least one interior microphone can therefore detect the influences of the sound system and/or the influences of other occupants on the vehicle vibrations 105. The interior microphone can correspond to a hands-free microphone and/or microphone for voice control (which is present or carried in many vehicles).

The method according to the invention can further comprise ascertaining a time interval in the near feature in which at least one piece of haptic driver information is supposed to be output or is output. Additionally, the method can comprise ascertaining an amplitude and/or frequency values of one or more vehicle vibrations 105, at least some of which are (will be) effected in the same time interval. Additionally, the method according to the invention can comprise varying an amplitude and/or a frequency value of the driver information to be transmitted haptically, at least some of which is supposed to be provided in said time interval. A time interval can in this case also be represented by a (brief) instant.

The haptic driver information can be varied such that the perceptibility of the output haptic driver information is above the haptic perception threshold of a (representative or statistical) human being by a prescribed measure. Alternatively or additionally, the haptic driver information can be varied such that the perceptibility of the output haptic driver information is below a prescribed disturbance threshold for a human being other than the driver, in particular for the perception position of another occupant (e.g. front-seat passenger) of the vehicle, by a prescribed measure. In this case, the perceptibility can correspond to a previously ascertained perceptibility in the time interval of the output of the haptic driver information.

The varying of the haptic driver information can follow a time curve that is dependent on a time curve with which the vehicle vibrations 105 are altered. In particular, a profile of the amplitude and/or frequency value of the haptic driver information can be varied according to a time dependency (in the form of a curve) that is dependent on a time dependency representing the time characteristic of the amplitude and/or frequency value of the vehicle vibrations. By way of example, an intensity and/or amplitude of the haptic driver information can fall when a haptic contact has improved, and/or can fall when the haptic contact worsens, and/or can rise as the measure of unevennesses of the road travelled on rises, and/or can rise as a speed of travel rises, and/or can rise with a combinational value comprising the measure of unevennesses and the speed of travel. Further, at least part of the driver information can be positioned along the time axis, in particular brought forward, deferred, repeated one or more times or split into at least two portions, such that the perceptibility or distinguishability by the driver is increased and/or disturbance of the driver or of the front-seat passenger is avoided.

The method described in the present case can ensure that haptic driver information is reliably perceptible and not a disturbance even in different driving situations. In particular, the method described can generate haptic driver information that is reliably distinguishable from other vehicle vibrations. In this case, it is moreover possible for settings for the intensity of the haptic driver information that are desired by the driver and are therefore user-dependent to be taken into consideration.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing and transmitting driver information, wherein at least part of the driver information is produced as haptic driver information on a control element of a vehicle, the method comprising:
    ascertaining a measure of a haptic contact between a driver of the vehicle and the control element via which the driver drives the vehicle;
    selecting for production, based on the ascertained measure of the haptic contact, at least one from among the following:
        the haptic driver information on the control element, and
        non-haptic driver information that is perceptible by the driver via a non-haptic perception channel; and
    producing the selected of: the haptic driver information on the control element, and the non-haptic driver information perceptible by the driver via the non-haptic perception channel.

2. The method as claimed in claim 1, wherein the amplitude and/or frequency and/or the duration of the haptic driver information to be produced varies or is set based on the ascertained measure of the haptic contact between the driver of the vehicle and the control element for controlling the vehicle.

3. The method as claimed in claim 2, wherein at least one vibration parameter in the vehicle is ascertained as a measure of vibrations prevailing in the vehicle at present or in the near future and said at least one vibration parameter is taken as a basis for at least one of:
    adjusting the amplitude and/or frequency of the haptic driver information,
    adjusting a time interval or a starting time for output of the haptic driver information,
    moving the production of at least part of the haptic driver information to other parts of the vehicle.

4. The method as claimed in claim 1, wherein at least one vibration parameter in the vehicle is ascertained as a measure of vibrations prevailing in the vehicle at present or in the near future and said at least one vibration parameter is taken as a basis for at least one of:
    adjusting the amplitude and/or frequency of the haptic driver information, adjusting a time interval or a starting time for output of the haptic driver information, moving the production of at least part of the haptic driver information to other parts of the vehicle.

5. The method as claimed in claim 4, wherein producing the haptic driver information on the control element of the vehicle is brought forward or put back in time based on the ascertained measure of the haptic contact and/or based on the at least one ascertained vibration parameter, and/or is split into at least two parts, and/or is adjusted to suit a particular time interval or an event.

6. The method as claimed in claim 5, wherein an amplitude pattern and/or frequency pattern of the haptic driver information is chosen or adjusted based on the ascertained measure of a haptic contact between the driver of the vehicle and the control element for controlling the vehicle, and/or based on the at least one ascertained vibration parameter.

7. The method as claimed in claim 5, wherein the ascertained measure of a haptic contact between the driver of the vehicle and the control element for controlling the vehicle and/or the at least one ascertained vibration parameter is/are taken as a basis for the driver information as auxiliary driver information being at least partially moved to at least one other perception channel of the driver.

8. The method as claimed in claim 4, wherein an amplitude pattern and/or frequency pattern of the haptic driver information is chosen or adjusted based on the ascertained measure of a haptic contact between the driver of the vehicle and the control element for controlling the vehicle, and/or based on the at least one ascertained vibration parameter.

9. The method as claimed in claim 8, wherein the ascertained measure of a haptic contact between the driver of the vehicle and the control element for controlling the vehicle and/or the at least one ascertained vibration parameter is/are taken as a basis for the driver information as auxiliary driver information being at least partially moved to at least one other perception channel of the driver.

10. The method as claimed in claim 4, wherein the ascertained measure of a haptic contact between the driver of the vehicle and the control element for controlling the vehicle and/or the at least one ascertained vibration parameter is/are taken as a basis for the driver information as auxiliary driver information being at least partially moved to at least one other perception channel of the driver.

11. The method as claimed in claim 4, wherein the at least one vibration parameter is ascertained based on unevennesses of a road area travelled on by the vehicle in the present time interval or in a time interval in the near future.

12. The method as claimed in claim 4, wherein the at least one vibration parameter is ascertained based on at least one of the following:
information about a condition of a road from a digital navigation map;
sensor data of an ambient sensor of the vehicle configured to detect part of the road travelled on by the vehicle;
sensor data of a vertical dynamic sensor of the vehicle;
sensor data of an inertial sensor and/or acceleration sensor of the vehicle;
a characteristic quantity representing a rotation speed or current gear of a drive system of the vehicle; and/or
sensor data of a motion and/or force sensor on the manual control element of the vehicle.

13. The method as claimed in claim 4, wherein
the haptic driver information comprises one or more frequency components having a respective amplitude and a respective frequency; and
the amplitude and/or frequency of the one or more frequency components of the haptic driver information is adjusted based on the measure of a haptic contact between the driver of the vehicle and the control element for controlling the vehicle and/or based on the at least one ascertained vibration parameter.

14. The method as claimed in claim 4, wherein
the at least one ascertained vibration parameter represents a current measure of vibrations in the vehicle and a predicted future change in the measure of vibrations in the vehicle, and
the predicted future change in the measure of vibrations of the vehicle is ascertained based on a planned trajectory of the vehicle.

15. The method as claimed in claim 4, wherein the haptic driver information is to be output in an upcoming time interval, and wherein the at least one ascertained vibration parameter relates to at least part of the upcoming time interval.

16. The method as claimed in claim 1, wherein the amplitude, frequency or pattern of the haptic driver information is chosen such that the haptic driver information is below a disturbance threshold for the driver of the vehicle at which the haptic driver information is perceived as substantially uncomfortable, wherein the disturbance threshold is chosen based on the vibration parameters in the vehicle and/or based on the measure of the haptic contact between the driver of the vehicle and the control element for controlling the vehicle.

17. A computer program product embodied in a non-transitory computer readable storage medium to produce and transmit driver information, wherein at least part of the driver information is produced as haptic driver information on a control element of a vehicle, the computer program product comprising processor executable instructions to:
ascertain a measure of a haptic contact between a driver of the vehicle and the control element via which the driver drives the vehicle;
selecting for production, based on the ascertained measure of the haptic contact, at least one from among the following:
the haptic driver information on the control element, and
non-haptic driver information that is perceptible by the driver via a non-haptic perception channel; and
produce the selected of: the haptic driver information on the control element, and the non-haptic driver information perceptible by the driver via the non-haptic perception channel.

18. An apparatus configured to produce and transmit driver information, wherein at least part of the driver information is produced as haptic driver information on a control element of a vehicle, wherein the apparatus is configured to:
ascertain a measure of a haptic contact between a driver of the vehicle and the control element via which the driver drives the vehicle,
selecting for production, based on the ascertained measure of the haptic contact, at least one from among the following:
the haptic driver information on the control element, and
driver information that is perceptible by the driver via a non-haptic perception channel; and
producing the selected of: the haptic driver information on the control element, and the non-haptic driver information perceptible by the driver via the non-haptic perception channel.

* * * * *